United States Patent
Sampath et al.

(10) Patent No.: US 9,350,495 B2
(45) Date of Patent: May 24, 2016

(54) METHOD AND APPARATUS FOR MULTICAST BLOCK ACKNOWLEDGMENT

(75) Inventors: Hemanth Sampath, San Diego, CA (US); Santosh Paul Abraham, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 956 days.

(21) Appl. No.: 12/951,510

(22) Filed: Nov. 22, 2010

(65) Prior Publication Data

US 2011/0286377 A1  Nov. 24, 2011

Related U.S. Application Data

(60) Provisional application No. 61/267,734, filed on Dec. 8, 2009.

(51) Int. Cl.
| | |
|---|---|
| *H04H 20/71* | (2008.01) |
| *H04L 1/16* | (2006.01) |
| *H04L 1/00* | (2006.01) |

(52) U.S. Cl.
CPC ............ *H04L 1/1671* (2013.01); *H04L 1/1614* (2013.01); *H04L 2001/0093* (2013.01)

(58) Field of Classification Search
CPC ................................ H04W 4/00; H04W 72/00
USPC .................. 370/477, 474, 389–428, 328–338
See application file for complete search history.

(56) References Cited

U.S. PATENT DOCUMENTS

| | | | | |
|---|---|---|---|---|
| 6,028,866 | A * | 2/2000 | Engel et al. | 370/461 |
| 7,221,684 | B1 * | 5/2007 | Smith et al. | 370/477 |
| 7,631,240 | B2 | 12/2009 | Frederiks et al. | |
| 2005/0237965 | A1 * | 10/2005 | Kuperschmidt et al. | 370/321 |
| 2006/0034274 | A1 * | 2/2006 | Kakani et al. | 370/389 |
| 2007/0096283 | A1 * | 5/2007 | Ljung et al. | 257/686 |
| 2010/0054188 | A1 * | 3/2010 | Matsumoto et al. | 370/328 |

FOREIGN PATENT DOCUMENTS

| | | |
|---|---|---|
| CN | 1539215 A | 10/2004 |
| CN | 1656729 A | 8/2005 |
| EP | 1740005 A1 | 1/2007 |
| JP | 2007502076 A | 2/2007 |
| WO | WO-2008084807 A1 | 7/2008 |
| WO | 2008114510 A1 | 9/2008 |

OTHER PUBLICATIONS

International Search Report and written Opinion—PCT/US2010/059583—International Search Authority, European Patent Office, Feb. 17, 2011.
Sharp,"Optimized L1/L2 Control Channel Formats", 3GPP TSG-RAN WG2#57 R2-070514, 3GPP, Feb. 12, 2007, pp. 1-6, URL, http://www.3gpp.org/ftp/tsg_ran/WG2_RL2/TSGR2_57/Documents/R2-070514.zip.

* cited by examiner

*Primary Examiner* — Iqbal Zaidi
(74) *Attorney, Agent, or Firm* — Steven R. Thiel

(57) ABSTRACT

A method for wireless communications is disclosed that includes generating and interpreting multicast block acknowledgement frames. Group identifiers and apparatus identifiers are used for indicating the presence of aggregated acknowledgement information and for extracting acknowledgement information for individual stations.

79 Claims, 9 Drawing Sheets

Block Acknowledgment Frame

Block Acknowledgment Control Field

Block Acknowledgment Information Field

Per TID Info Field

Block Acknowledgment Information Field

METHOD AND APPARATUS FOR MULTICAST BLOCK ACKNOWLEDGMENT

CROSS-REFERENCE TO RELATED APPLICATIONS

This application claims priority under 35 U.S.C. §119(e) to U.S. Provisional Application No. 61/267,734, filed Dec. 8, 2009, which is hereby incorporated by reference in its entirety.

BACKGROUND

I. Field

The following description relates generally to communication systems, and more particularly to a method and apparatus for acknowledgement schemes.

II. Background

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when the access point acknowledges transmissions from multiple terminals, it is desirable to minimize the amount of traffic to complete the acknowledgement of all transmissions. Thus there is a need for an improved protocol for acknowledging transmissions from multiple terminals.

SUMMARY

In one aspect, a method of communication is provided. The method generally includes receiving one or more transmissions from one or more of a plurality of apparatuses, generating an acknowledgement message comprising at least a group identifier associated with at least the plurality of apparatuses and acknowledgement information based on the received one or more transmissions, and transmitting the acknowledgement message to the plurality of apparatuses.

In another aspect, an apparatus for communication is provided. The apparatus generally includes a receiver configured to receive one or more transmissions from one or more of a plurality of apparatuses, a processing system configured to generate an acknowledgement message comprising at least a group identifier associated with at least the plurality of apparatuses and acknowledgement information based on the received one or more transmissions, and a transmitter configured to transmit the acknowledgement message to the plurality of apparatuses.

In another aspect, the apparatus generally includes means for receiving one or more transmissions from one or more of a plurality of apparatuses, means for generating an acknowledgement message comprising at least a group identifier associated with at least the plurality of apparatuses and acknowledgement information based on the received one or more transmissions, and means for transmitting the acknowledgement message to the plurality of apparatuses.

In another aspect, a computer program product is provided. The computer program product generally includes a computer-readable medium having stored thereon, computer executable instructions that, if executed by an apparatus, cause the apparatus to perform a method. The method generally includes receiving one or more transmissions from one or more of a plurality of apparatuses, generating an acknowledgement message comprising at least a group identifier associated with at least the plurality of apparatuses and acknowledgement information based on the received one or more transmissions, and transmitting the acknowledgement message to the plurality of apparatuses.

In another aspect a wireless node is provided. The wireless node generally includes at least one antenna, a receiver configured to receive, via the at least one antenna, one or more transmissions from one or more of a plurality of apparatuses, processing system configured to generate an acknowledgement message comprising at least a group identifier associated with at least the plurality of apparatuses and acknowledgement information based on the received one or more transmissions, and a transmitter configured to transmit, via the at least one antenna, the acknowledgement message to the plurality of apparatuses.

In one aspect, a method of communication is provided. The method generally includes transmitting data from one of a plurality of apparatuses to a wireless node, receiving an acknowledgement message from the wireless node, the acknowledgement message comprising at least a group identifier associated with at least the plurality of apparatuses and acknowledgement information, and determining acknowledgement information for the one of the plurality of apparatuses based, at least in part, on the group identifier and the acknowledgement information.

In another aspect, an apparatus for communication is provided. The apparatus is one of a of a plurality of apparatuses associated with a group identifier and generally includes a transmitter configured to transmit data to a wireless node, a receiver configured to receive an acknowledgement message from the wireless node, the acknowledgement message comprising at least the group identifier and acknowledgement information, and a processing system configured to determine acknowledgement information for the apparatus based, at least in part, on the group identifier and the acknowledgement information.

In another aspect, the apparatus generally includes means for transmitting data to a wireless node, means for receiving an acknowledgement message from the wireless node, the acknowledgement message comprising at least the group identifier and acknowledgement information, and means for determining acknowledgement information for the apparatus based, at least in part, on the group identifier and the acknowledgement information.

In another aspect, a computer program product is provided. The computer program produce generally includes a computer-readable medium having stored thereon, computer executable instructions that, if executed by an apparatus, the apparatus being one of a plurality of apparatuses associated with a group identifier, cause the apparatus to perform a method. The method generally includes transmitting data from to a wireless node, receiving an acknowledgement message from the wireless node, the acknowledgement message comprising at least the group identifier and acknowledgement information, and determining acknowledgement information for the apparatus based, at least in part, on the group identifier and the acknowledgement information.

In another aspect an access terminal is provided. The access terminal generally includes at least one antenna, a transmitter configured to transmit, via the at least one antenna, data to a wireless node, a receiver configured to receive, via the at least one antenna, an acknowledgement message from the wireless node, the acknowledgement message comprising at least acknowledgement information and a group identifier associated with the access terminal and at least one other apparatus, and a processing system configured to determine acknowledgement information for the access terminal based, at least in part, on the group identifier and the acknowledgement information.

BRIEF DESCRIPTION OF THE DRAWINGS

These and other sample aspects of the invention will be described in the detailed description that follow, and in the accompanying drawings, wherein.

Figure 1:
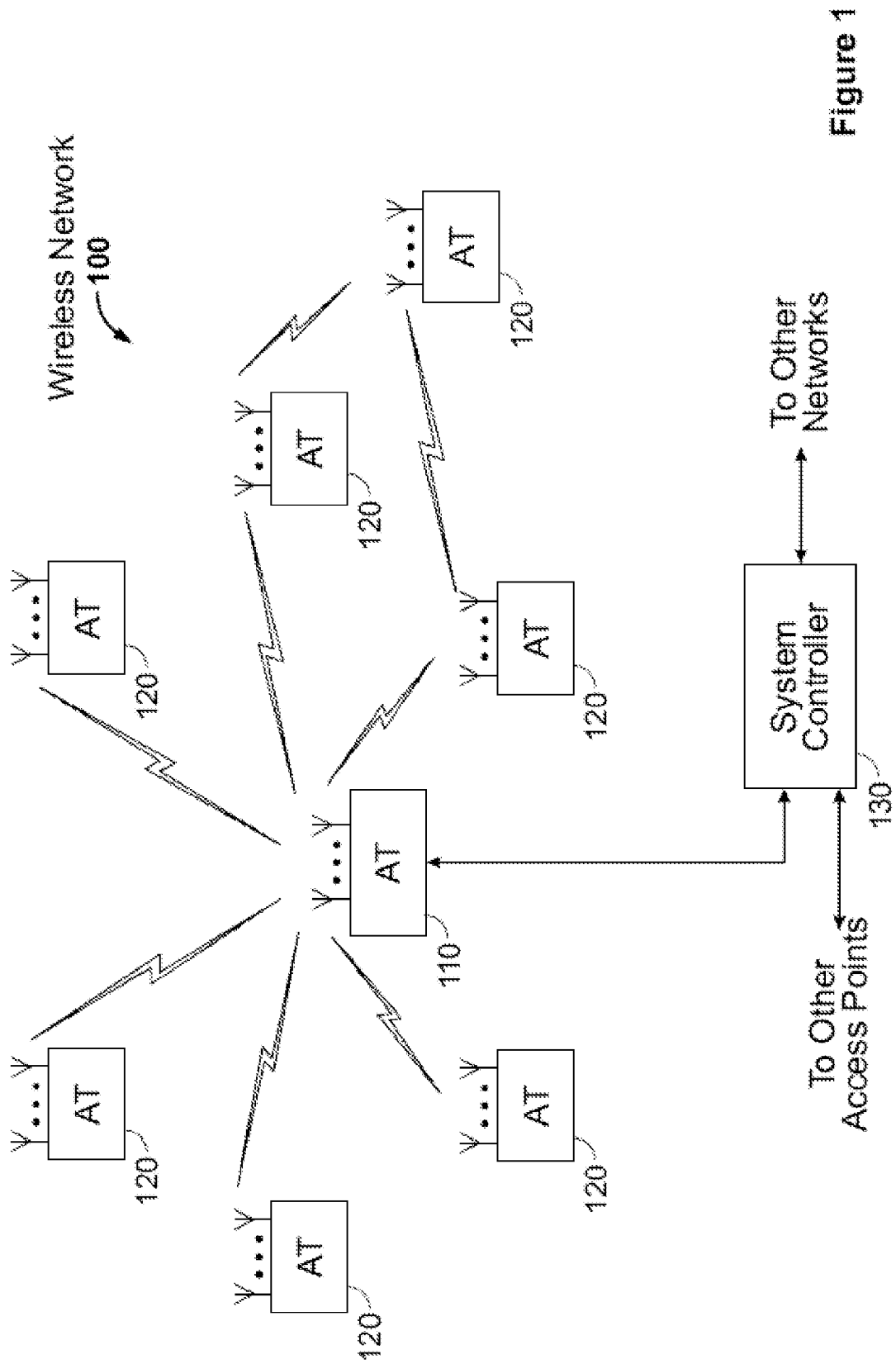
FIG. 1 is a diagram of a wireless communications network configured in accordance with an aspect of the disclosure.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of the novel systems, apparatus, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Several aspects of a wireless network will now be presented with reference to FIG. 1. The wireless network 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal, a mobile station, a subscriber station, a station, a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node is in a transmit mode, the application layer processes data, segments the data into packets, and provides the data packets to the MAC layer. The MAC layer assembles MAC packets with each data packet from the application layer being carried by the payload of a MAC packet. Alternatively, the payload for a MAC packet may carry a fragment of a data packet or multiple data packets from the application layer. Each MAC packet includes a MAC header and an error detection code. The MAC packet is sometimes referred to as a MAC Protocol Data Unit (MPDU), but may also be referred to as a frame, packet, timeslot, segment, or any other suitable nomenclature.

When the MAC decides to transmit, it provides a block of MAC packets to the PHY layer. The PHY layer assembles a PHY packet by assembling the block of MAC packets into a payload and adding a preamble. As will be discussed in greater detail later, the PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer.

The MAC layer checks the error detection code for each MAC packet to determine whether it was successfully decoded. If the error detection code for a MAC packet indicates that it was successfully decoded, then the payload for the MAC packet is provided to the application layer. If the error detection code for a MAC packet indicates that it was unsuccessfully decoded, the MAC packet is discarded. A Block ACKnowledgement (BACK) may be sent back to the transmitting node indicating which data packets were successfully decoded. The transmitting node uses the BACK to determine which data packets, if any, require retransmission.

Figure 2:
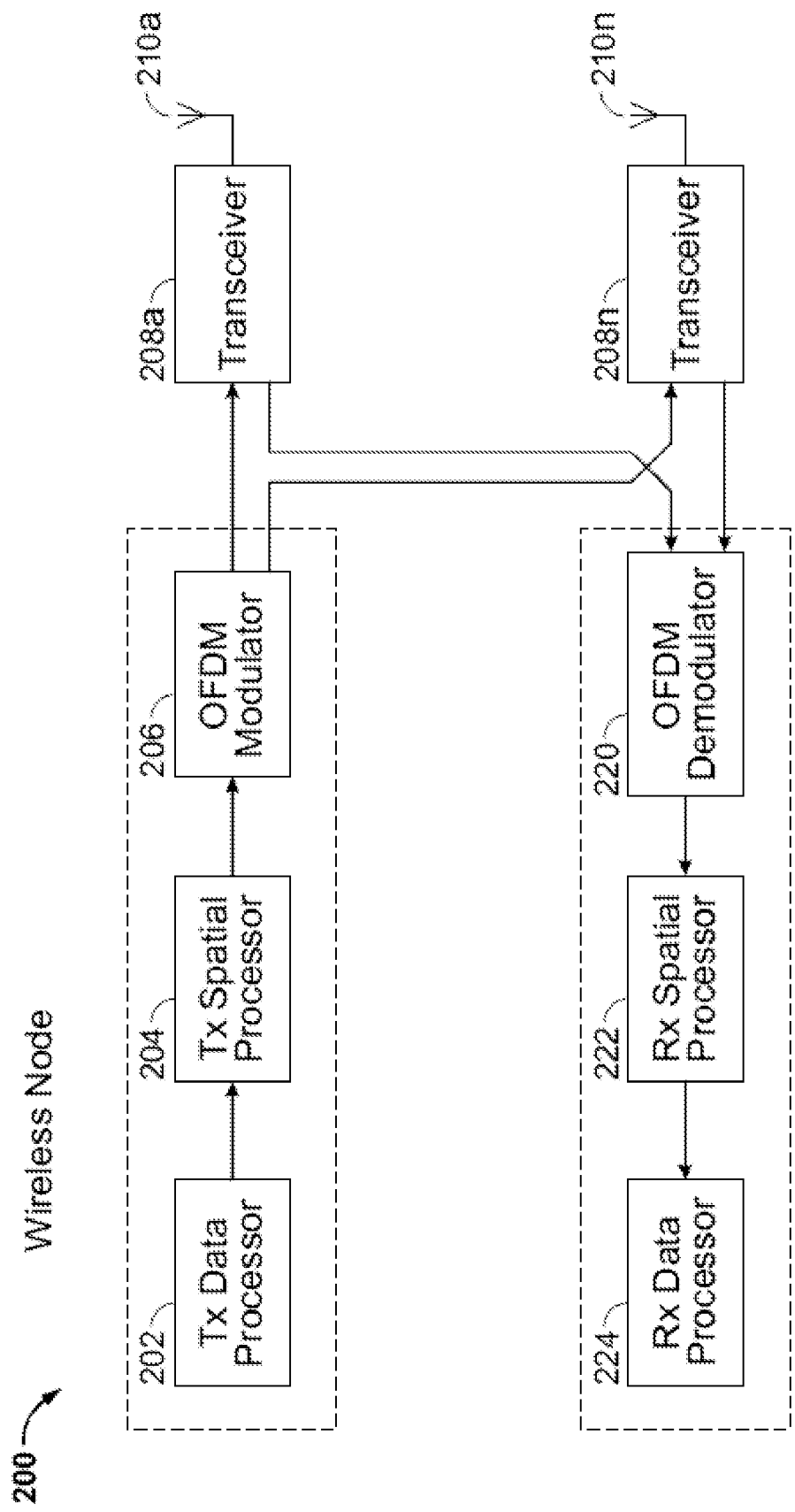
FIG. 2 is a block diagram of a wireless node that includes a front end processing system in a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate Forward Error Correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator 204 splits the modulation symbols into parallel streams. Each stream is then mapped to an OFDM subcarrier and then combined using an Inverse Fast Fourier Transform (IFFT) to produce a TX spatial processor 204 that performs spatial processing of the modulation symbols. This may be accomplished by spatially precoding the modulation symbols before providing them to an OFDM modulator 206.

The OFDM modulator 206 splits the modulation symbols into parallel streams. Each stream is then mapped to an OFDM subcarrier and then combined together using an Inverse Fast Fourier Transform (IFFT) to produce a time domain OFDM stream. Each spatially precoded OFDM stream is then provided to a different antenna 210*a*-210*n* via a respective transceiver 208*a*-208*n*. Each transceiver 208*a*-208*n* modulates an RF carrier with a respective precoded stream for transmission over the wireless channel.

In a receive mode, each transceiver 208a-208n receives a signal through its respective antenna 210a-210n. Each transceiver 208a-208n may be used to recover the information modulated onto an RF carrier and provide the information to an OFDM demodulator 220.

The RX spatial processor 220 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222.

In wireless nodes implementing OFDM, the stream (or combined stream) from the transceiver 208a-208n is provided to an OFDM demodulator 220. The OFDM demodulator 220 converts the stream (or combined stream) from time-domain to the frequency domain using a Fast Fourier Transform (FFT). The frequency domain signal comprises a separate stream for each subcarrier of the OFDM signal. The OFDM demodulator 220 recovers the data (i.e., modulation symbols) carried on each subcarrier and multiplexes the data into a stream of modulation symbols before sending the stream to a RX spatial processor 222.

The RX spatial processor 222 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222.

A RX data processor 224 may be used to translate the modulation symbols back to the correct point in the signal constellation. Because of noise and other disturbances in the wireless channel, the modulation symbols may not correspond to an exact location of a point in the original signal constellation. The RX data processor 224 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 224 then uses the sequence of code symbol LLRs in order to decode the data that was originally transmitted before providing the data to the MAC layer.

Figure 3:
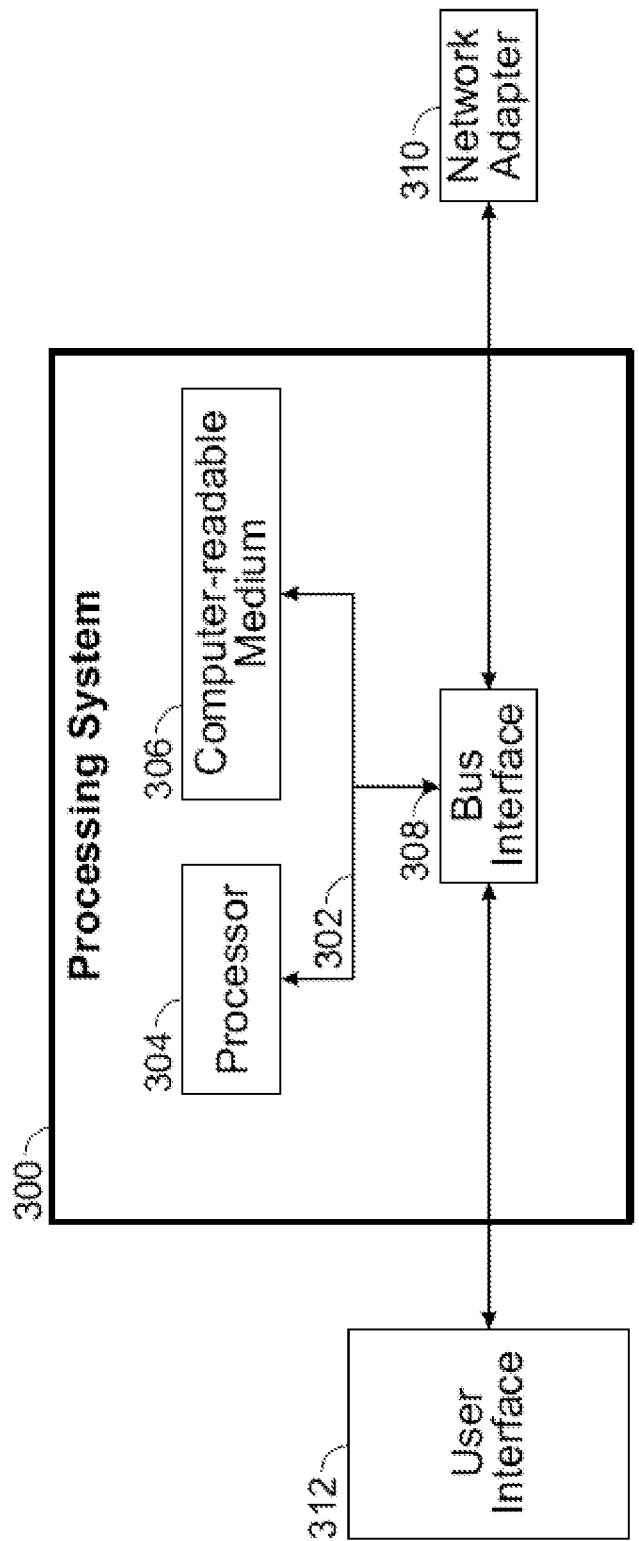
FIG. 3 is a block diagram of an apparatus that includes a processing system.

FIG. 3 illustrates an example of a hardware configuration for a processing system 300 in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, computer-readable media 306, and a bus interface 308. The bus interface 308 may be used to connect a network adapter 310, among other things, to the processing system 300 via the bus 302. The network interface 310 may be used to implement the signal processing functions of the PHY layer. In the case of an access terminal 110 (see FIG. 1), a user interface 312 (e.g., keypad, display, mouse, joystick, etc.) may also be connected to the bus via the bus interface 308. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the computer-readable media 308. The processor 308 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, signal, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

In the hardware implementation illustrated in FIG. 3, the computer-readable media 306 is shown as part of the processing system 300 separate from the processor 304. However, as those skilled in the art will readily appreciate, the computer-readable media 306, or any portion thereof, may be external to the processing system 300. By way of example, the computer-readable media 306 may include a transmission line, a carrier wave modulated by data, a signal, and/or a computer product separate from the wireless node, all which may be accessed by the processor 304 through the bus interface 308. Alternatively, or in addition to, the computer readable media 304, or any portion thereof, may be integrated into the processor 304, such as the case may be with cache and/or general register files. Similarly, the bus interface 308, network adapter 310, and user interface 312 may be internal or external to the processing system 300.

The processing system 300 may be implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Figure 4:
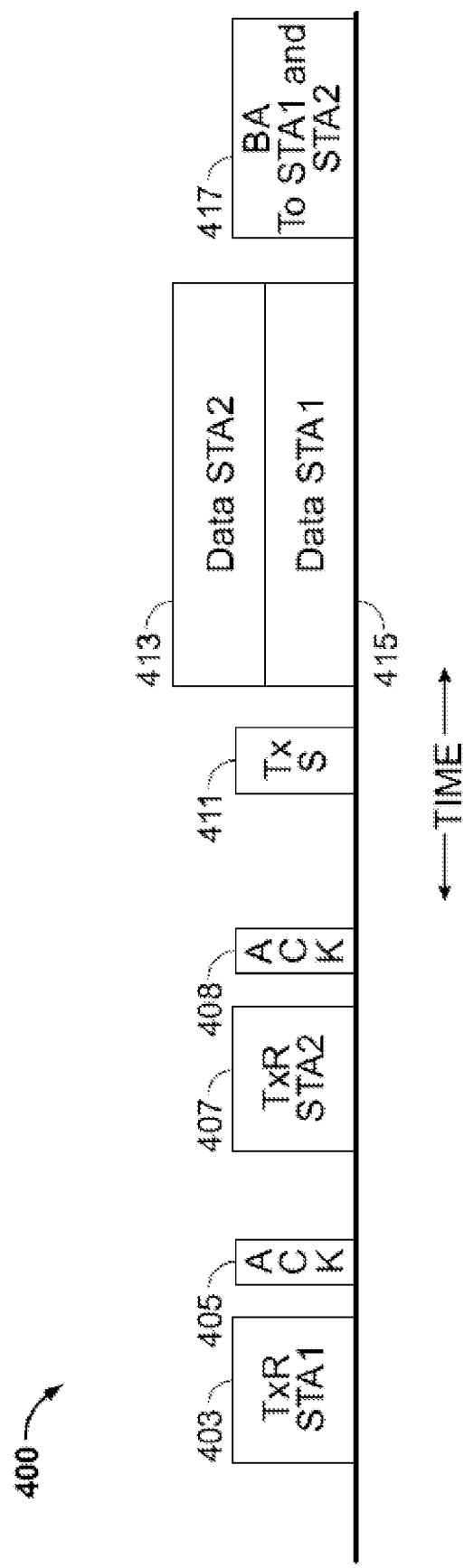
FIG. 4 is a timing diagram of communications.

FIG. 4 illustrates a timing diagram 400. The timing diagram is illustrated with a system in which one access point is associated with a plurality of stations. For example, the system includes at least station one, station two, station three, and station four. Of course, the system may include additional or fewer stations. As depicted, station one may send a transmit request 403 to the access point requesting the opportunity to transmit data to the access point. In response to the request, the access point may send an acknowledgement 405 to station one. Station four may also send a transmission request 407 the access point. The access point may respond with an acknowledgement 409 to station four. After receiving and acknowledging the various transmission requests 403 and 407, the access point may multicast a transmission start message 411 to at least station one and station four that indicates that station one and station four can begin transmitting data in accordance with information in the transmission start message 411. In response to the transmission start message 411, station one and station four begin sending respective data messages 413 and 415 to the access point. As discussed above, the access point may have multiple antennas and may be capable of concurrently receiving transmissions from both stations. In another aspect, the transmission start message 411 may indicate different times within a single frame during which station one and station four are to transmit data messages. Thus, the respective data messages 413 and 415 may be received at different times. After receiving the respective data messages 413 and 415, the access point may send an acknowledgement to the stations. As described below, it may be advantageous to send a single block acknowledgement message 417 to station one and station four that includes all of the acknowledgement information for both stations. Using a multicast block acknowledgement may save on overhead compared to sending separate acknowledgement messages to each station. Further, as described below, a multicast block acknowledgement may be implemented without extensive modifications to communications standards such as IEEE 802.11.

Figure 5:
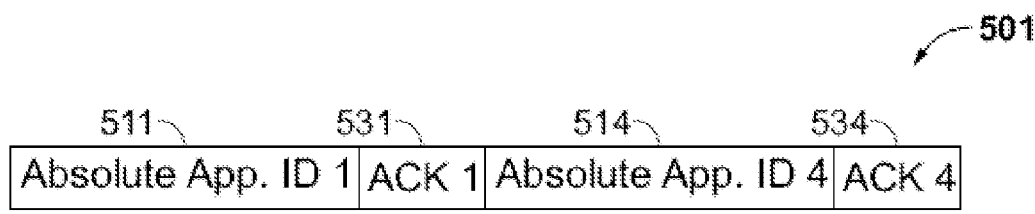
FIG. 5 is a diagram illustrating a block acknowledgement frame including absolute apparatus identifiers.

FIG. 5 is a diagram illustrating a block acknowledgement message including absolute apparatus identifiers. The block acknowledgement message 501 begins with an absolute apparatus identifier associated with station one 511. In one aspect, the absolute apparatus identifier associated with station one 511 can uniquely refer to station one 511 amongst stations which are associated with the access point. The absolute apparatus identifier may be assigned to a station by the access point upon association. For example, the absolute apparatus identifier may be an association identifier (AID). An association identifier can be, for example, 12 bits. In another aspect, the absolute apparatus identifier associated with station one 511 can uniquely refer to station one 511 amongst stations which are associated with the access point and stations which are not associated with the access point. The absolute apparatus identifier may be assigned to a station by the manufacturer and stored in hardware of the station. More particularly, the absolute apparatus identifier may be assigned to the station prior to associated with the access point. For example, the absolute apparatus identifier may be a media access control (MAC) address. A media access control address can be, for example, 48 bits.

The block acknowledgement message 501 continues with acknowledgement information for station one 531. The acknowledgement information may include, for example, a bitmap that represents the acknowledgement status of one or more particular transmissions from a station to the access point. For example, the data transmitted by station one to the access point 413 may include a plurality of packets, and the acknowledgement information may include a number of bits, each bit corresponding to one of the packets and representing whether or not the packet is acknowledged. The acknowledgement information may also include additional information as described below.

The block acknowledgement message 501 also includes an absolute apparatus identifier for station four 514 and acknowledgement information for station four 534. The absolute apparatus identifier and acknowledgement information may be as described above with respect to station one but refers to station four and the data transmitted by station four 415, respectively.

Figure 6:
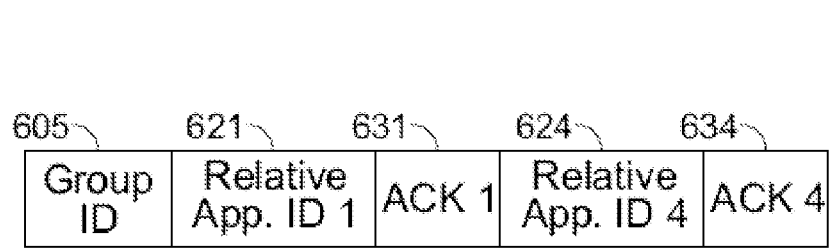
FIG. 6 is a diagram illustrating the contents and structure of a block acknowledgement frame including a group identifier and relative apparatus identifiers.

FIG. 6 is a diagram illustrating a block acknowledgement message including a group identifier and relative apparatus identifiers. As described above, an absolute apparatus identifier may uniquely refers to a station and differentiate that station amongst stations which are associated with the access point and stations which are not associated with the access point. Thus, an absolute apparatus identifier may be quite long. For example, an absolute apparatus identifier may be a MAC address and may include 48 bits. In contrast, a relative apparatus identifier assigned to a station intended to differentiate that station only from stations within a particular group may include as few as ceiling($\log_2(N)$) bits, where N is the number of stations in the particular group, and ceiling(x) is the smallest integer not less than x.

The block acknowledgement message 601 begins with a group identifier 605 associated with a plurality of stations, including station one and station four. The group identifier 605 may, in one aspect, be assigned to multiple stations by the access point during association. In one aspect, the group identifier 605 is a media access control (MAC) address.

The block acknowledgement message 601 continues with a relative apparatus identifier associated with station one 621. As described above, the relative apparatus identifier differentiates station one from other stations within the group. The block acknowledgement message 601 further continues by transmitting acknowledgement information for station one 631. The acknowledgement information may be as described above with respect to FIG. 5.

The block acknowledgement message 601 also includes a relative apparatus identifier for station four 624 and acknowledgement information for station four 634. The absolute apparatus identifier and acknowledgement information may be as described above with respect to station one but refers to station four and the data transmitted by station four 415, respectively.

Because the block acknowledgement message 601 includes a group identifier 605 and relative apparatus identifiers 621 and 624 rather than absolute apparatus identifiers as in the block acknowledgement message 501 of FIG. 5, fewer bits may be transmitted. For example, assuming that each absolute apparatus identifier is a 48-bit MAC address, it would require 96 bits to transmit the absolute apparatus identifiers 511 and 514 in the block acknowledgement message 501 of FIG. 5. Each relative apparatus identifier may include few as ceiling($\log_2(N)$) bits. Assuming there are four stations in the group associated with the access point, each relative apparatus identifier may be only two bits. Thus, assuming that the group identifier is a 48-bit MAC address, the group identifier 605 and the relative apparatus identifiers 621 and 624 may require as few as 52 bits.

Figure 7:
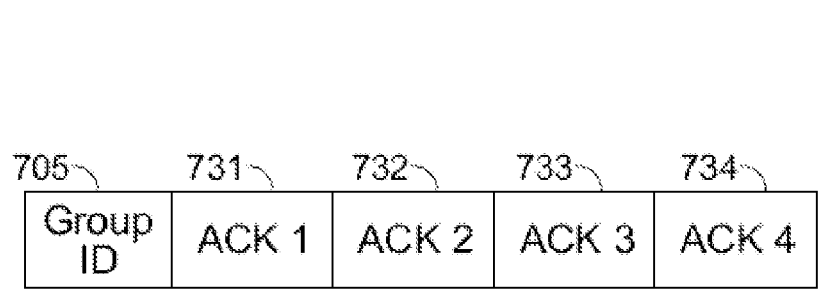
FIG. 7 is a diagram illustrating the contents and structure of a block acknowledgement frame including a group identifier and no apparatus identifiers.

FIG. 7 is a diagram illustrating a block acknowledgement message including a group identifier and no apparatus identifiers. The block acknowledgement message 701 begins with a group identifier 705. The group identifier 705 may be as described above with respect to FIG. 6. The block acknowledgement message 701 continues with acknowledgement information for station one 731, station two 732, station three 733, and station four 734. Although the block acknowledgement message does not include apparatus identifiers, station one and station four are able to determine which acknowledgement information refers to the data that each station transmitted by virtue of the ordering or arrangement of the acknowledgement information. Thus, station one assumes that the first acknowledgement information refers to the data that station one transmitted 413 and station four assumes that the fourth acknowledgement information refers to the data that station four transmitted 415.

The acknowledgement information for station two 732 and station three 733 may be dummy acknowledgement information in the absence of data transmitted from station two or station three. The dummy acknowledgement information may be all zeroes. In another aspect, these bits are used for other purposes, such as channel estimation or other side channel communications. Dummy acknowledgement information for other stations may or may not be included. For example, dummy acknowledgement information for a fifth station is unnecessary for station one and station four to determine which acknowledgement information refers to the data it transmitted. However, dummy acknowledgement information for a fifth station may be included for channel estimation or other side channel communications.

Because the block acknowledgement message 701 does not include apparatus identifiers, it may require fewer bits to transmit than the block acknowledgement message 601 of FIG. 6. For example, assuming that each group identifier 605 and 705 is a 48-bit MAC address, that each relative apparatus identifier 612 and 624 is two bits, and that each acknowledgement information 631, 634, 731, 732, 733, and 744 is one bit, it would require 54 bits to transmit the block acknowledgement message 601 of FIG. 6 and only 52 bits to transmit the block acknowledgement message 701 of FIG. 7.

However, if one assumes that each acknowledgement information 631, 634, 731, 732, 733, and 744 is four bits, it would take 60 bits to transmit the block acknowledgement message 601 of FIG. 6 and 64 bits to transmit the block acknowledgement message 701 of FIG. 7. Thus, in one aspect, the access point determines the length of the block acknowledgement message using the format of FIG. 6 and the length of the block acknowledgement message using the format of FIG. 7 and transmits the block acknowledgement message including fewer bits. The block acknowledgement message may include a field indicating which format is being used.

Figure 8A:
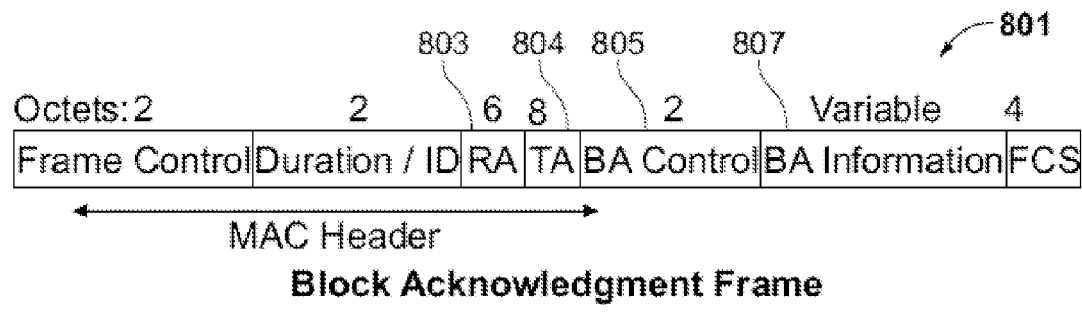
FIG. 8A is a diagram illustrating the contents and structure of a block acknowledgement frame according to one aspect.

FIG. 8A is a diagram illustrating the contents and structure of a block acknowledgement (BA) frame according to one aspect. While aspects may be described in relation to the IEEE 802.11 standard, it will be appreciated that the various aspects may be implemented according to the specifics of other communications protocols as well. FIG. 8A illustrates a block acknowledgement (BA) frame 801. The BA frame 801 includes a receiver address 803 and a transmitter address 804. In one aspect, the receiver address field 803 may comprise a media access control (MAC) address. In one aspect, the transmitter address field 804 may comprise a media access control (MAC) address. For example, if a single station were to receive a block acknowledgement, the receiver address field 803 may contain the MAC address of the single station or another absolute apparatus identifier. However, the BA frame may be used to multicast a single acknowledgement to multiple stations. Thus, in another aspect, the receiver address field 803 may contain a group identifier rather than an identifier for a single station. In another aspect, the transmitter address field 804 may contain a group identifier rather than an identifier for a single station. The acquisition and use of the group identifier is described in greater detail below. The BA frame 801 also comprises a block acknowledgement control field 805 and block acknowledgement information field 807 which are described further below.

Figure 8B:
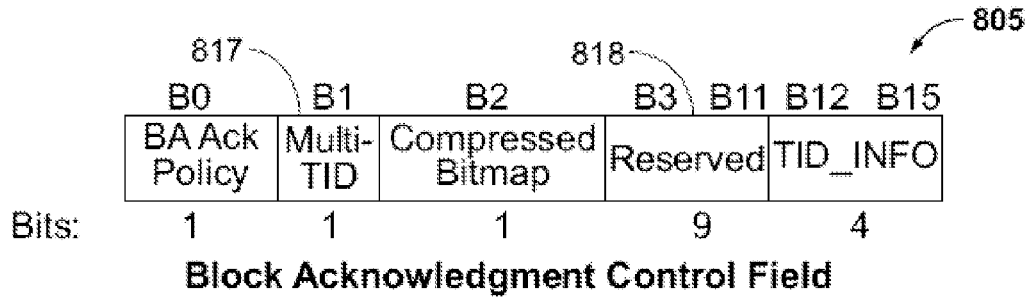
FIG. 8B is a diagram illustrating the contents and structure of a block acknowledgement control field.

FIG. 8B is a diagram illustrating the contents and structure of a block acknowledgement (BA) control field 805. In addition to other information, the BA control field 805 comprises a multi-traffic identifier (multi TID) field 817. When the BA frame 801 is used to acknowledge traffic from a single station, the multi-TID field 817 may be used to indicate that multiple traffic elements are in use by the station. For example, the station might be engaged in transmitting video information as well as e-mail information. These different traffic elements, or flows, may have different quality of service requirements and may otherwise be treated differently. The multi-TID field 817 may be used to indicate that multiple such traffic elements are present. However, as described below, the multi-TID field may also be used to indicate that acknowledgement for multiple stations, not just multiple traffic elements, is present in the BA frame 801. In particular, the multi-TID field may be based on a number of apparatuses for which acknowledgement information is included in the block acknowledgement. The BA control field 805 may also comprise a reserved field 819. The reserved field 819 may include a plurality of reserved bits. In another aspect, one or more of the reserved bits in the reserved field 819 may be used to indicate that acknowledgement information is present in the BA frame 801 for multiple stations.

Figure 8C:
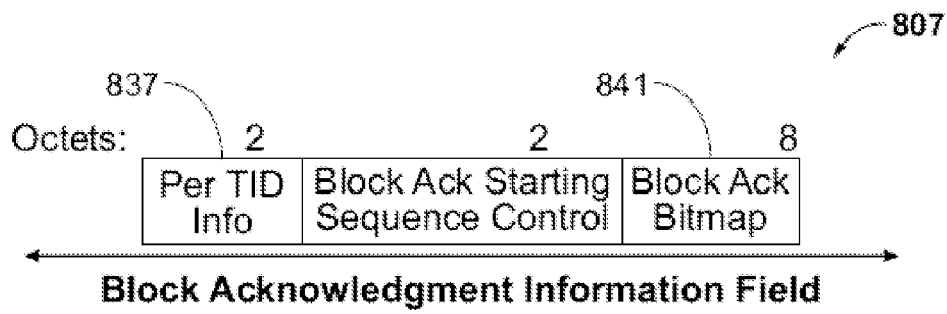
FIG. 8C is a diagram illustrating the contents and structure of a block acknowledgement information field.

FIG. 8C is a diagram illustrating the contents and structure of a block acknowledgement (BA) information field 807. In one aspect, a BA frame 801 may include multiple instances of BA information fields. For example, if a BA frame 801 is being used to acknowledge multiple traffic elements originating from a single station, the BA information field 807 may be repeated for each traffic element being utilized by the station. Each instance of the BA information field 807 may contain information for identifying the traffic element to which the acknowledgement information in the field pertains. For example, the BA information field 807 may comprise a per transit identification information (per TID info) field 837. The per TID info field 837 may be used to distinguish between the various traffic elements in use by the station. In addition, as described below, when acknowledgement information for multiple stations is aggregated into a single BA frame 801, the per TID info field 837 may also be used to distinguish between acknowledgement information for different stations. The BA information field 837 may also contain a representation of the acknowledgement information relating to a particular traffic element. For example, the BA information field 837 may comprise a bitmap 841 that represents the acknowledgement status of one or more particular transmissions from a station to the access point. This acknowledgement status may be referred to herein as acknowledgement information. The acknowledgement information in a particular BA information field 837 may be referred to as a portion of the acknowledgement information. The term acknowledgement information may refer to a plurality of acknowledgement information portions.

Figure 8D:
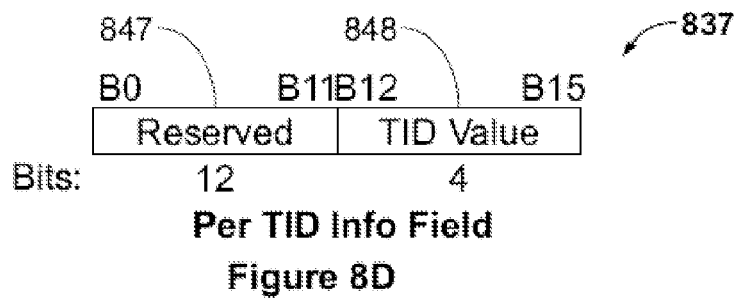
FIG. 8D is a diagram illustrating the contents and structure of a per traffic identifier information field.

FIG. 8D is a diagram illustrating the contents and structure of a per traffic identifier information (per TID info) field 837. The per TID info field 837 comprises a reserved field 847 and a traffic identifier (TID) value field 849. When the BA frame 801 is used for acknowledging transmissions from a single station, the TID value field 849 is used to identify acknowledgement information for a particular traffic element of the station. However, in one aspect, when the BA frame 801 is used to acknowledge transmissions from multiple stations, the reserved field 847 may be used to indicate a particular station to which the corresponding portion of the acknowledgement information pertains. In particular, one or more of the reserved bits in the reserved field 847 may be set to identify a particular station. Thus, the per TID info field 837 may be used to specify a particular station and traffic element for that station.

Figure 9:
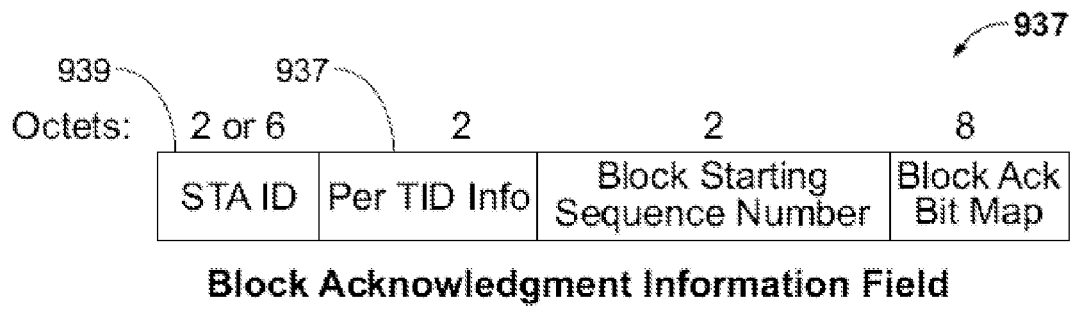
FIG. 9 is a diagram illustrating the contents and structure of a block acknowledgement information field according to another aspect.

FIG. 9 is a diagram illustrating the contents and structure of a block acknowledgement information field according to another aspect. In several respects, the BA info field 935 is similar to the BA info field 807 of FIG. 5C. For example, the BA info field comprises a per TID info field 837 similar to that of per TID info field 737 of FIG. 5C. However, the BA info field 835 comprises a station identifier (STA ID) field 839. The STA ID field may also be referred to as an apparatus identifier field. STA ID field 839 may be used as a dedicated field for identifying the station to which a particular acknowledgement information portion pertains. Thus, rather than encoding a station identifier in the reserved bits of the per TID info field 837, the station identifier may be encoded in the STA ID field 839. In one aspect, the STA ID field is six octets in size to accommodate a MAC address or other absolute apparatus identifier. In another aspect, the STA ID field comprises two octets to accommodate a relative apparatus identifier for a particular station. In other aspects, the STA ID field may comprise other lengths of bits to accommodate other identifiers. As described above, the use of apparatus identifiers in the BA frame enables efficient aggregation of acknowledgement information for multiple stations in a single BA frame.

Figure 10:
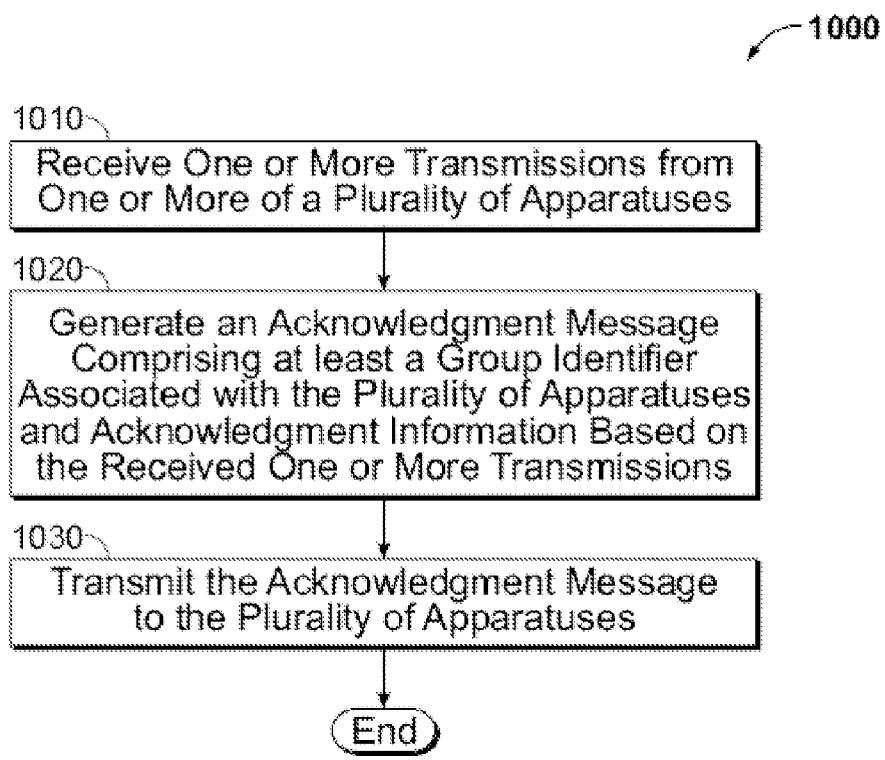
FIG. 10 is a flowchart of a method for acknowledging transmissions using a multicast block acknowledgement.

FIG. 10 is a flowchart of a method for acknowledging transmissions using a multicast block acknowledgement. In one aspect, the method 1000 may be implemented on an access point similar to access point 110 of FIG. 1.

The method 1000 begins in block 1010 with the reception of one or more transmissions from one or more of a plurality of apparatuses. The reception can be performed, for example, by the access point 110 of FIG. 1 or the transceiver 210a and 210n of FIG. 2. As noted above, the transmissions from each of the stations may comprise multiple traffic elements and each traffic element may have its own traffic identifier.

The method 1000 continues to block 1020 with the generation of an acknowledgement message comprising at least a group identifier associated with at least the plurality of apparatuses and acknowledgement information based on the received one or more transmissions. The generation can be performed, for example, by the access point 110 of FIG. 1 or the processing system 300 of FIG. 3. In different aspects, the acknowledgement message may be modified in different ways in order to facilitate interpretation of the aggregated acknowledgement information. In one aspect, a receiver address field in the acknowledgement message may be set to the group identifier. This may be interpreted by receiving stations as meaning that the acknowledgement message contains acknowledgement information for more than one station. In another aspect, the acknowledgement message may include a multi-TID bit in a BA control field that is set to one. This may be interpreted by receiving stations as indicating that the acknowledgement message contains acknowledgement information for more than one station. In another aspect, a zero value in the multi-TID bit field could be used to indicate the presence of aggregated acknowledgement information. In another aspect, the one or more bits in a reserved field of a BA control field may be set to a predetermined pattern to indicate that the acknowledgement message comprises acknowledgement information for multiple stations. For example, the last bit of the reserved field may be set to one in order to indicate the presence of aggregated acknowledgement information. In other aspects, other patterns may be used.

The group identifier may be as described above with respect to FIG. 6 and FIG. 7. In one aspect, the group identifier is represented as a MAC address. The group identifier may be a static identifier or it may be generated or otherwise determined periodically or in response to other stimuli such as a station joining the network or communication conditions in the network. In one aspect, the group identifier may be agreed to ahead of time by the manufacturers of the stations and access points. In another aspect, the group identifier may be obtained by the access point and distributed to the stations during association. In another aspect, the group identifier may be communicated to the stations using other messages such as the TxS message described above. As described above, the group identifier may be used by the individual stations to recognize that an aggregated block acknowledgement frame is being used.

In one aspect, the acknowledgement message includes apparatus identifiers. In one aspect, the apparatus identifiers may absolute apparatus identifiers. For example, the apparatus identifiers may be media access control (MAC) addresses. In another aspect, the apparatus identifiers may be relative apparatus identifiers. The relative apparatus identifiers may be generated and assigned during association. In another aspect, the relative apparatus identifiers may be implicitly derived by a station from an ordered listing of the stations. For example, if four stations are participating in the network, the four stations might respectively be identified as 0x00, 0x01, 0x10, and 0x11. In one aspect, the relative apparatus identifiers correspond to the order in which the stations are listed in the TxS message described above. In particular, in one aspect the relative apparatus identifiers are determined based on an arrangement of information in the transmission start message. In another aspect, the relative apparatus identifiers may be explicitly listed in the TxS message. In one aspect, the relative apparatus identifiers are temporary and are replaced after a period of time or after a number of cycles or uses. Thus, in one aspect, the apparatus identifiers are temporary identifiers. As described above with respect to FIG. 6, the relative apparatus identifiers may be used by the respective stations to identify which portion of a block acknowledgement message contains pertinent acknowledgement information. In another aspect, as described above with respect to FIG. 7, stations may identify which portion of a block acknowledgement message contains pertinent acknowledgement information from the order of the acknowledgement information. In particular, the stations may identify the pertinent portions based on the arrangement of information in the acknowledgment message.

The method continues to block 1030 with the transmission of the acknowledgement message. The transmission can be performed, for example, by the access point 110 of FIG. 1 or the transceiver 210a and 210n of FIG. 2. The transmission may be received by one or more stations and interpreted as described below with respect to FIG. 11.

Figure 11:
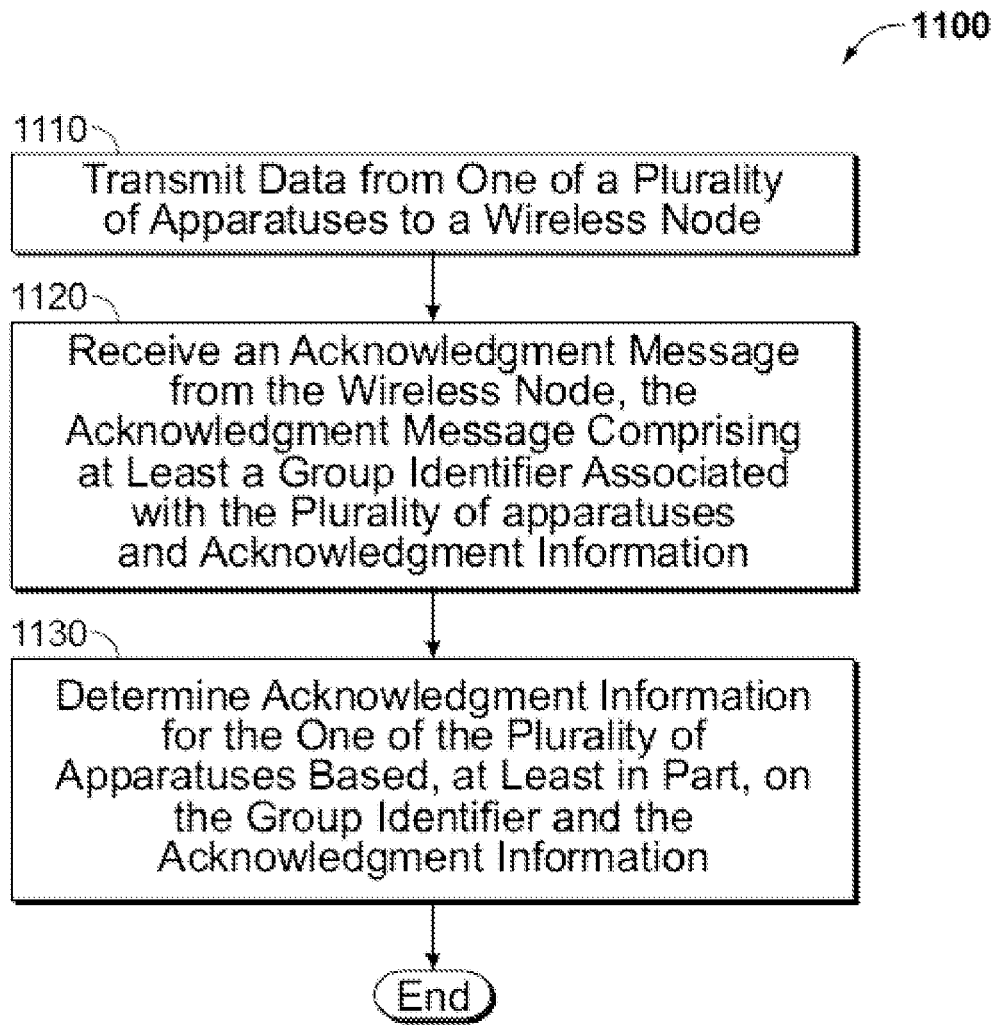
FIG. 11 is a flowchart illustrating a method for receiving and interpreting aggregated acknowledgement information.

FIG. 11 is a flowchart illustrating a method for receiving and interpreting aggregated acknowledgement information. In one aspect, the method 1100 may be implemented on one or more stations such as the stations 120 of FIG. 1.

The method 1100 begins at block 1110, with the transmission of data from one of a plurality of apparatuses to a wireless node. The transmission can be performed, for example, by the station 120 of FIG. 1 or the transceiver 210a and 210n of FIG. 2. The method 1100 continues to block 1120 with the reception of an acknowledgement message from the wireless node, the acknowledgement message comprising at least a group identifier associated with at least the plurality of apparatuses and acknowledgement information. The types of group identifiers are discussed above with respect to FIG. 10. The reception can be performed, for example, by the station 120 of FIG. 1 or the transceiver 210a and 210n of FIG. 2.

The method 1100 continues to block 130 with the determination of acknowledgement information for the one of the plurality of apparatuses based, at least in part, on the group identifier and the acknowledgement information. The determination may be conducted by checking the acknowledgement for various identifiers, patterns, and values, such as those described above. For example, a station may determine whether a receiver address in the BA frame is set to a group identifier. In another aspect, a station may determine if a multi-TID bit or one or more of the reserved bits in a BA control field is set to indicate the presence of aggregated acknowledgement information. If aggregated acknowledgement information is present, the station may proceed to analyze the acknowledgement information portions to determine which, if any, pertain to the station. For example, in one aspect, the station may examine the acknowledgement message for a relative apparatus identifier associated with the station. In another aspect, the station may determine which portions of the acknowledgement information pertain to the station by analyzing the order of the acknowledgement information. As another example, in one aspect, the station may examine one or more of the reserved bits in the per TID info field of each BA information field to determine if the one or more reserved bits match the identifier for the station. The station may interpret the acknowledgement information and use it planning future communications with the access point.

Figure 12:
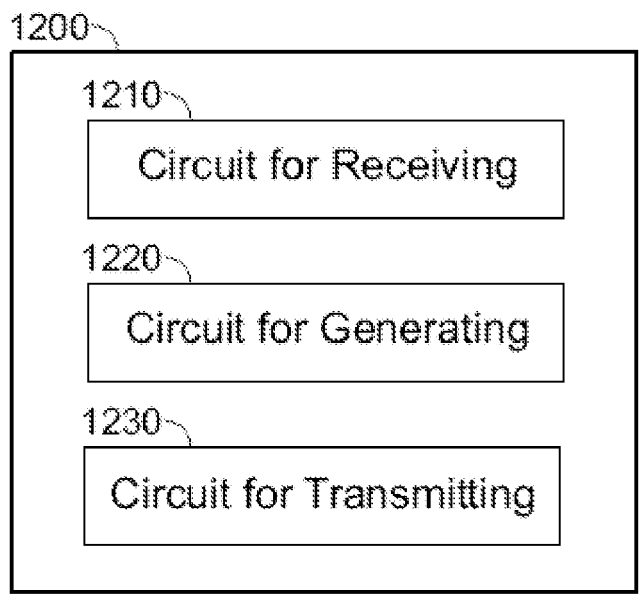
FIG. 12 illustrates an aspect of an apparatus for use in the communication system illustrated in FIG. 1.

The functionality described herein (e.g., with regard to one or more of the accompanying figures) may correspond in some aspects to similarly designated "means for" functionality in the appended claims. For example, FIG. 12 illustrates an aspect of a wireless node 1200 comprising a circuit for receiving 1210, a circuit for generating 1220, and a circuit for transmitting 1230.

The circuit for receiving 1210 may be configured to receive one or more transmissions from one or more of a plurality of apparatuses. The circuit for receiving 1210 may be implemented, in whole or in part, as at least one antenna, a transceiver, a receiver, a processing system, or a network adapter. Means for receiving may include the circuit for receiving 1210. The circuit for generating 1220 may be configured to generate an acknowledgement message comprising at least a group identifier associated with at least the plurality of apparatuses and acknowledgement information based on the received transmissions. The circuit for generating 1220 may be implemented, in whole or in part, as a processing system or a network adapter. Means for generating may include the circuit for generating 1220. The circuit for transmitting 1230 may be configured to transmit the acknowledgement message to the plurality of apparatuses. The circuit for transmitting 1230 may be implemented, in whole or in part, as at least one antenna, a transceiver, a transmitter, a processing system, or a network adapter. Means for transmitting may include the circuit for transmitting 1230. The wireless node 1200 may be configured to implement the functionality described herein and may be implemented in hardware or software or some combination thereof as described above with respect to FIG. 2 and FIG. 3. In particular, the wireless node 1200 may be configured to perform the functionality described above with respect to FIG. 10 and FIG. 11.

Figure 13:
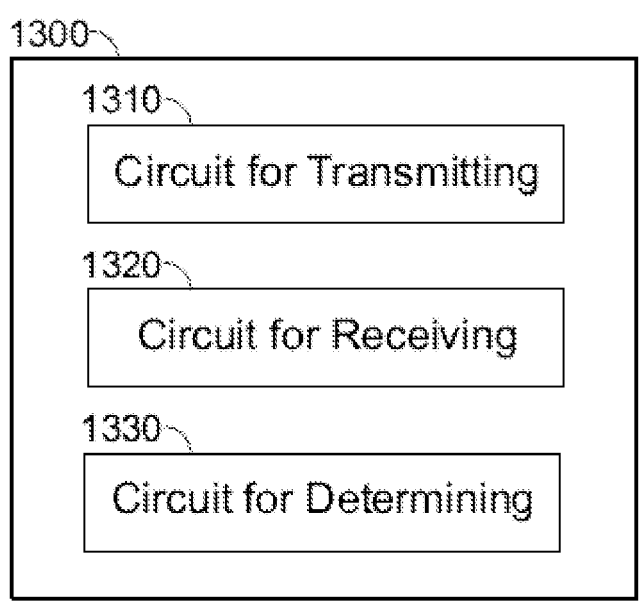
FIG. 13 illustrates another aspect of an apparatus for use in the communication system illustrated in FIG. 1.

FIG. 13 illustrates another aspect of a wireless node 1300 comprising a circuit for transmitting 1310, a circuit for receiving 1320, and a circuit for determining 1330. The circuit for transmitting 1310 may be configured to transmit data from one of a plurality of apparatuses to a wireless node. The circuit for transmitting 1310 may be implemented, in whole or in part, as at least one antenna, a transceiver, a transmitter, a processing system, or a network adapter. Means for transmitting may include the circuit for transmitting 1310. The circuit for receiving 1320 may be configured to receive an acknowledgement message from the wireless node, the acknowledgement message comprising at least a group identifier associated with at least the plurality of apparatuses and acknowledgement information. The circuit for receiving 1320 may be implemented, in whole or in part, as at least one antenna, a transceiver, a receiver, a processing system, or a network adapter. Means for receiving may include the circuit for receiving 1320. The circuit for determining 1330 may be configured to determine acknowledgement information for the one of the plurality of apparatuses based, at least in part, on the group identifier and the acknowledgement information. The circuit for determining 1330 may be implemented, in whole or in part, as a processing system or a network adapter. Means for determining may include the circuit for determining 1330.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Further, "determining" may include resolving, selecting, choosing, establishing and the like.

The functionality of the circuits described with respect to FIG. 12 and FIG. 13 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The processing system, or any part of the processing system, may provide the means for performing the functions recited herein. Alternatively, the code on the computer-readable medium, or the computer-readable medium itself, may provide the means for performing the functions recited herein.

Those skilled in the art will recognize how best to implement the described functionality presented throughout this disclosure depending on the particular application and the overall design constraints imposed on the overall system.

It is understood that any specific order or hierarchy of steps described in the context of a method or software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of communication, the method comprising:
   receiving one or more transmissions from one or more of a plurality of apparatuses;
   generating an acknowledgement message comprising one or more identifiers corresponding to the one or more of the plurality of apparatuses, and acknowledgement information based on the received one or more transmissions, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and
   transmitting the acknowledgement message to the plurality of apparatuses.

2. The method of claim 1, wherein the apparatus identifiers are relative apparatus identifiers.

3. The method of claim 1, wherein the apparatus identifiers are temporary identifiers.

4. The method of claim 1, wherein the group identifier comprises a media access control address.

5. The method of claim 1, further comprising transmitting the group identifier during an association.

6. The method of claim 1, further comprising transmitting a transmission start message to the one or more of the plurality of apparatuses.

7. The method of claim 6, wherein the transmission start message comprises the group identifier.

8. The method of claim 1, wherein the acknowledgement message further comprises one or more traffic identifiers respectively associated with one or more traffic elements of the received one or more transmissions.

9. The method of claim 1, wherein the block acknowledgement comprises a receiver address field and wherein the receiver address field comprises the group identifier.

10. The method of claim 1, wherein the block acknowledgement comprises a transmitter address field and wherein the transmitter address field comprises the group identifier.

11. The method of claim 1, wherein the block acknowledgement comprises a multi-traffic identifier field, and wherein the method further comprises determining a value of the multi-traffic identifier field based, at least in part, on a number of apparatuses for which acknowledgement information is included in the block acknowledgement.

12. The method of claim 1, wherein the block acknowledgement comprises a block acknowledgement control field, the block acknowledgement control field comprising a plurality of reserved bits, and wherein the method further comprises determining a value of each of one or more of the plurality of reserved bits based, at least in part, on a number of apparatuses for which acknowledgement information is included in the block acknowledgement.

13. The method of claim 1, wherein the block acknowledgement comprises one or more block acknowledgement information fields, wherein each block acknowledgement information field comprises an apparatus identifier field, the apparatus identifier field comprising an apparatus identifier for one of the one or more of the plurality of apparatuses.

14. An apparatus for communication, the apparatus comprising:
   a receiver configured to receive one or more transmissions from one or more of a plurality of apparatuses;
   a processing system configured to generate an acknowledgement message comprising one or more identifiers corresponding to the one or more of the plurality of apparatuses, and acknowledgement information based on the received one or more transmissions, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and a transmitter configured to transmit the acknowledgement message to the plurality of apparatuses.

15. The apparatus of claim 14, wherein the apparatus identifiers are relative apparatus identifiers.

16. The apparatus of claim 14, wherein the apparatus identifiers are temporary identifiers.

17. The apparatus of claim 14, wherein the group identifier comprises a media access control address.

18. The apparatus of claim 14, where the transmitter is further configured to transmit the group identifier during an association.

19. The apparatus of claim 14, wherein the transmitter is further configured to transmit a transmission start message to the one or more of the plurality of apparatuses.

20. The apparatus of claim 19, wherein the transmission start message comprises the group identifier.

21. The apparatus of claim 14, wherein the acknowledgement message further comprises one or more traffic identifiers respectively associated with one or more traffic elements of the received one or more transmissions.

22. The apparatus of claim 14, wherein the block acknowledgement comprises a receiver address field and wherein the receiver address field comprises the group identifier.

23. The apparatus of claim 14, wherein the block acknowledgement comprises a transmitter address field and wherein the transmitter address field comprises the group identifier.

24. The apparatus of claim 14, wherein the block acknowledgement comprises a multi-traffic identifier field, and wherein the processing system is further configured to determine a value of the multi-traffic identifier field based, at least in part, on a number of apparatuses for which acknowledgement information is included in the block acknowledgement.

25. The apparatus of claim 14, wherein the block acknowledgement comprises a block acknowledgement control field, the block acknowledgement control field comprising a plurality of reserved bits, and wherein the processing system is further configured to determine a value of each of one or more of the plurality of reserved bits based, at least in part, on a number of apparatuses for which acknowledgement information is included in the block acknowledgement.

26. The apparatus of claim 14, wherein the block acknowledgement comprises one or more block acknowledgement information fields, wherein respective block acknowledgement information field comprises an apparatus identifier field, the apparatus identifier field comprising an apparatus identifier for one of the one or more of the plurality of apparatuses.

27. An apparatus for communication, the apparatus comprising:
means for receiving one or more transmissions from one or more of a plurality of apparatuses;
means for generating an acknowledgement message comprising one or more identifiers corresponding to the one or more of the plurality of apparatuses, and acknowledgement information based on the received one or more transmissions, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and
means for transmitting the acknowledgement message to the plurality of apparatuses.

28. The apparatus of claim 27, wherein the apparatus identifiers are relative apparatus identifiers.

29. The apparatus of claim 27, wherein the apparatus identifiers are temporary identifiers.

30. The apparatus of claim 27, wherein the group identifier comprises a media access control address.

31. The apparatus of claim 27, where the means for transmitting is further configured to transmit the group identifier during an association.

32. The apparatus of claim 27, wherein the means for transmitting is further configured to transmit a transmission start message to the one or more of the plurality of apparatuses.

33. The apparatus of claim 32, wherein the transmission start message comprises the group identifier.

34. The apparatus of claim 27, wherein the acknowledgement message further comprises one or more traffic identifiers respectively associated with one or more traffic elements of the received one or more transmissions.

35. The apparatus of claim 27, wherein the block acknowledgement comprises a receiver address field and wherein the receiver address field comprises the group identifier.

36. The apparatus of claim 27, wherein the block acknowledgement comprises a transmitter address field and wherein the transmitter address field comprises the group identifier.

37. The apparatus of claim 27, wherein the block acknowledgement comprises a multi-traffic identifier field, and wherein the apparatus further comprises means for determining a value of the multi-traffic identifier field based, at least in part, on a number of apparatuses for which acknowledgement information is included in the block acknowledgement.

38. The apparatus of claim 27, wherein the block acknowledgement comprises a block acknowledgement control field, the block acknowledgement control field comprising a plurality of reserved bits, and wherein the apparatus further comprises means for determining a value of each of one or more of the plurality of reserved bits based, at least in part, on a number of apparatuses for which acknowledgement information is included in the block acknowledgement.

39. The apparatus of claim 27, wherein the block acknowledgement comprises one or more block acknowledgement information fields, wherein each block acknowledgement information field comprises an apparatus identifier field, the apparatus identifier field comprising an apparatus identifier for one of the one or more of the plurality of apparatuses.

40. A a non-transitory computer-readable storage device having stored thereon, computer executable instructions that, if executed by an apparatus, cause the apparatus to perform a method comprising:
receiving one or more transmissions from one or more of a plurality of apparatuses;
generating an acknowledgement message comprising one or more identifiers corresponding to the one or more of the plurality of apparatuses, and acknowledgement information based on the received one or more transmissions, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and transmitting the acknowledgement message to the plurality of apparatuses.

41. A wireless node comprising:

at least one antenna;

a receiver configured to receive, via the at least one antenna, one or more transmissions from one or more of a plurality of apparatuses;

a processing system configured to generate an acknowledgement message comprising one or more identifiers corresponding to the one or more of the plurality of apparatuses, and acknowledgement information based on the received one or more transmissions, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and a transmitter configured to transmit, via the at least one antenna, the acknowledgement message to the plurality of apparatuses.

42. A method of communication, the method comprising:

transmitting data from one of a plurality of apparatuses to a wireless node;

receiving an acknowledgement message from the wireless node, the acknowledgement message comprising one or more identifiers corresponding to the one or more of the plurality of apparatuses and acknowledgement information, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and determining acknowledgement information for the one of the plurality of apparatuses based, at least in part, on the group identifier, the apparatus identifier, and the acknowledgement information.

43. The method of claim 42, wherein the apparatus identifier is a relative apparatus identifier.

44. The method of claim 42, wherein the apparatus identifier is a temporary identifier.

45. The method of claim 42, further comprising receiving a transmission start message from the wireless node before transmitting data.

46. The method of claim 45, further comprising determining an apparatus identifier corresponding to the one of the plurality of apparatuses based, at least in part, on an arrangement of information in the transmission start message.

47. The method of claim 45, wherein the transmission start message comprises the group identifier.

48. The method of claim 42, wherein the group identifier comprises a media access control address.

49. The method of claim 42, further comprising receiving the group identifier during an association.

50. The method of claim 42, wherein determining the acknowledgement information for the one of the plurality of apparatuses is based, at least in part, on an arrangement of information in the acknowledgement message.

51. The method of claim 42, wherein the acknowledgement message further comprises one or more traffic identifiers respectively associated with one or more traffic elements of the transmitted data.

52. The method of claim 42, wherein the block acknowledgement comprises a receiver address field and wherein the receiver address field comprises the group identifier.

53. The method of claim 42, wherein the block acknowledgement comprises a transmitter address field and wherein the transmitter address field comprises the group identifier.

54. An apparatus for communication, the apparatus being one of a plurality of apparatuses associated with a group identifier, the apparatus comprising:

a transmitter configured to transmit data to a wireless node;

a receiver configured to receive an acknowledgement message from the wireless node, the acknowledgement message comprising one or more identifiers corresponding to the one or more of the plurality of apparatuses and acknowledgement information, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and a processing system configured to determine acknowledgement information for the apparatus based, at least in part, on the group identifier, the apparatus identifier, and the acknowledgement information.

55. The apparatus of claim 54, wherein the apparatus identifier is a relative apparatus identifier.

56. The apparatus of claim 54, wherein the apparatus identifier is a temporary identifier.

57. The apparatus of claim 54, wherein the receiver is further configured to receive a transmission start message from the wireless node before transmitting data.

58. The apparatus of claim 57, wherein the processing system is further configured to determine an apparatus identifier corresponding to the one of the plurality of apparatuses based, at least in part, on an arrangement of information in the transmission start message.

59. The apparatus of claim 57, wherein the transmission start message comprises the group identifier.

60. The apparatus of claim 54, wherein the group identifier comprises a media access control address.

61. The apparatus of claim 54, wherein the receiver is further configured to receive the group identifier during an association.

62. The apparatus of claim 54, wherein the processing system is further configured to determine the acknowledgement information for the apparatus based, at least in part, on an arrangement of information in the received acknowledgement message.

63. The apparatus of claim 54, wherein the acknowledgement message further comprises one or more traffic identifiers respectively associated with one or more traffic elements of the transmitted data.

64. The apparatus of claim 54, wherein the block acknowledgement comprises a receiver address field and wherein the receiver address field comprises the group identifier.

65. The apparatus of claim 54, wherein the block acknowledgement comprises a transmitter address field and wherein the transmitter address field comprises the group identifier.

66. An apparatus for communication, the apparatus being one of a plurality of apparatuses associated with a group identifier, the apparatus comprising:

means for transmitting data to a wireless node;

means for receiving an acknowledgement message from the wireless node, the acknowledgement message comprising one or more identifiers corresponding to the one or more of the plurality of apparatuses and acknowledgement information, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and means for determining acknowledgement information for the apparatus based, at least in part, on the group identifier, the apparatus identifier, and the acknowledgement information.

67. The apparatus of claim 66, wherein the apparatus identifier is a relative apparatus identifier.

68. The apparatus of claim 66, wherein the apparatus identifier is a temporary identifier.

69. The apparatus of claim 66, wherein the means for receiving is further configured to receive a transmission start message from the wireless node before transmitting data.

70. The apparatus of claim 69, wherein the means for determining is further configured to determine an apparatus identifier corresponding to the apparatus based, at least in part, on an arrangement of information in the transmission start message.

71. The apparatus of claim 69, wherein the transmission start message comprises the group identifier.

72. The apparatus of claim 66, wherein the group identifier comprises a media access control address.

73. The apparatus of claim 66, wherein the means for receiving is further configured to receive the group identifier during an association.

74. The apparatus of claim 66, wherein the means for determining is further configured to determine the acknowledgement information for the apparatus based, at least in part, on an arrangement of information in the received acknowledgement message.

75. The apparatus of claim 66, wherein the acknowledgement message further comprises one or more traffic identifiers respectively associated with one or more traffic elements of the transmitted data.

76. The apparatus of claim 66, wherein the block acknowledgement comprises a receiver address field and wherein the receiver address field comprises the group identifier.

77. The apparatus of claim 66, wherein the block acknowledgement comprises a transmitter address field and wherein the transmitter address field comprises the group identifier.

78. A non-transitory computer-readable storage device having stored thereon, computer executable instructions that, if executed by an apparatus, the apparatus being one of a plurality of apparatuses associated with a group identifier, cause the apparatus to perform a method comprising:

transmitting data to a wireless node;

receiving an acknowledgement message from the wireless node, the acknowledgement message comprising at one or more identifiers corresponding to the one or more of the plurality of apparatuses and acknowledgement information, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and determining acknowledgement information for the apparatus based, at least in part, on the group identifier, the apparatus identifier, and the acknowledgement information.

79. An access terminal comprising:

at least one antenna;

a transmitter configured to transmit, via the at least one antenna, data to a wireless node;

a receiver configured to receive, via the at least one antenna, an acknowledgement message from the wireless node, the acknowledgement message comprising at least acknowledgement information and one or more identifiers corresponding to the one or more of the plurality of apparatuses, wherein the acknowledgement message comprises a block acknowledgement comprising one or more per traffic identifier info fields, each per traffic identifier info field comprising a plurality of reserved bits, and wherein one or more of the plurality of reserved bits comprise an apparatus identifier for one of the one or more of the plurality of apparatuses; and a processing system configured to determine acknowledgement information for the access terminal based, at least in part, on the group identifier, the apparatus identifier, and the acknowledgement information.

* * * * *